J. Critchley,
Pipe Expander.
Nº 51,563. Patented Dec. 19, 1865.

Witnesses;

Inventor;
John Critchley
By Munn & Co
attys

UNITED STATES PATENT OFFICE.

JOHN CRITCHLEY, OF PORTSMOUTH, NEW HAMPSHIRE.

IMPROVED EXPANDING-TOOL.

Specification forming part of Letters Patent No. 51,563, dated December 19, 1865.

*To all whom it may concern:*

Be it known that I, JOHN CRITCHLEY, of Portsmouth, in the county of Rockingham and State of New Hampshire, have invented a new and useful Improvement in Expanding-Tools; and I do hereby declare that the following is a full, clear, and exact description thereof, which will enable those skilled in the art to make and use the same, reference being had to the accompanying drawings, forming part of this specification, in which—

Figure 1:
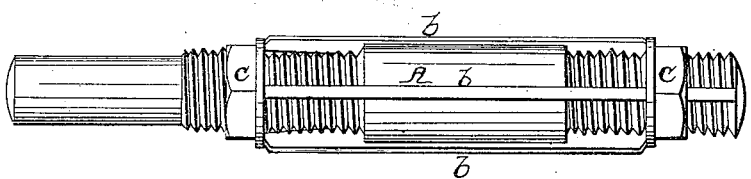
Figure 2:
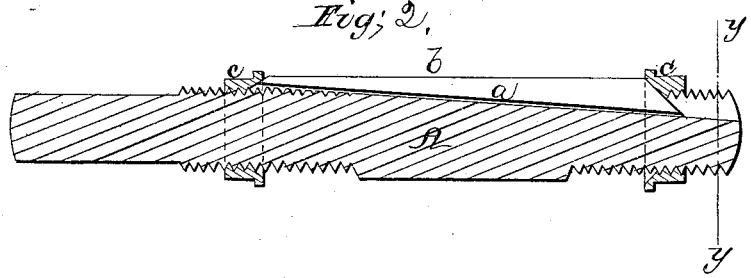
Figure 3:
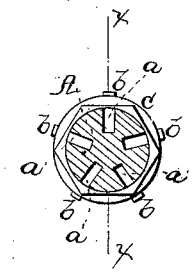

Figure 1 represents a side elevation of this invention. Fig. 2 is a longitudinal central section of the same, taken in the plane indicated by the line $x\,x$, Fig. 3. Fig. 3 is a transverse section of the same, the line $y\,y$, Fig. 2, indicating the plane of section.

Similar letters of reference indicate corresponding parts.

This invention relates to a tool which can be used as a mandrel or for reaming, tapping, boring, and other work.

It consists of a cylindrical stock with three or more tapering grooves cut in its surface parallel to its axis, in combination with keys fitting into said grooves, and with nuts applied to the ends of the stock and bearing on the ends of the keys or cutters in such a manner that by unscrewing one of the nuts and screwing up the other the keys or cutters are caused to slide in the tapering grooves, and consequently to expand or contract radially, and an expanding mandrel, reamer, tap, or other tool is obtained of great practical convenience.

A represents the stock of my tool, which is provided with five (more or less) tapering grooves, $a$, cut in parallel to the axis of the cylindrical stock. These grooves are intended to receive the keys or cutters $b$, which are also made tapering, as shown in Fig. 2, and the ends of which are beveled off and made to fit the countersunk nuts $c$. These nuts screw on the ends of the stock A, and by unscrewing one and screwing up the other the keys or cutters are caused to slide in the grooves and the tool is expanded or contracted.

The great convenience of this tool as a mandrel for turning, or as a reamer, (if, instead of the keys, cutters are used,) or as a tap will be apparent to every practical mechanic, and requires no further explanation.

I claim as new and desire to secure by Letters Patent—

The expanding-tool herein described, consisting of the stock A, provided with the radial grooves $a$, the nuts $c$, and keys or cutters $b$, all constructed and arranged in the manner and for the purpose specified.

JOHN CRITCHLEY.

Witnesses:
WILLIAM CARTLIDGE, Jr.,
WILLIAM CRITCHLEY, Jr.